(12) United States Patent
Raab et al.

(10) Patent No.: US 9,611,405 B2
(45) Date of Patent: Apr. 4, 2017

(54) METHOD FOR PRODUCING A STABLE DISPERSION OF NANO-PARTICLES, DISPERSION PRODUCED, AND USE THEREOF

(71) Applicant: GELITA AG, Eberbach (DE)

(72) Inventors: Alexander Raab, Neckarsteinach (DE); Matthias Reihmann, Hemsbach (DE); Christoph Simon, Eberbach (DE)

(73) Assignee: Gelita AG, Eberbach (DE)

( * ) Notice: Subject to any disclaimer, the term of this patent is extended or adjusted under 35 U.S.C. 154(b) by 162 days.

(21) Appl. No.: 14/165,873

(22) Filed: Jan. 28, 2014

(65) Prior Publication Data

US 2014/0137770 A1 May 22, 2014

Related U.S. Application Data

(63) Continuation of application No. PCT/EP2012/061939, filed on Jun. 21, 2012.

(30) Foreign Application Priority Data

Aug. 4, 2011 (DE) .................. 10 2011 052 396

(51) Int. Cl.
C09D 189/06 (2006.01)
B01J 13/00 (2006.01)

(52) U.S. Cl.
CPC ........ *C09D 189/06* (2013.01); *B01J 13/0034* (2013.01)

(58) Field of Classification Search
None
See application file for complete search history.

(56) References Cited

U.S. PATENT DOCUMENTS

| 5,556,638 A | 9/1996 | Wunderlich et al. |
| 5,560,924 A | 10/1996 | Wunderlich et al. |
| 5,614,219 A | 3/1997 | Wunderlich et al. |
| 5,932,245 A * | 8/1999 | Wunderlich ......... A61K 9/1658 424/451 |
| 6,136,520 A * | 10/2000 | Takamuki ................ G03C 1/95 430/523 |
| 7,410,650 B2 * | 8/2008 | Lin ........................ A01N 59/16 106/1.19 |
| 2006/0269987 A1 * | 11/2006 | Dolphin .................. C08L 89/06 435/68.1 |
| 2008/0160091 A1 | 7/2008 | Kropf et al. |
| 2009/0285963 A1 * | 11/2009 | Dick ........................ A23J 3/06 426/576 |
| 2012/0289536 A1 * | 11/2012 | Haeberlin ............ A61K 9/0056 514/291 |
| 2014/0242145 A1 * | 8/2014 | Yoo ...................... A61K 38/385 424/443 |

FOREIGN PATENT DOCUMENTS

| DE | 41 40 185 A1 | 6/1993 |
| DE | 41 40 195 A1 | 6/1993 |
| DE | 199 30 335 A1 | 1/2001 |
| DE | 10 2006 055 439 A1 | 5/2008 |
| EP | 2 319 643 A1 | 5/2011 |
| WO | WO 93/10761 A1 | 6/1993 |
| WO | WO 93/10766 A1 | 6/1993 |

OTHER PUBLICATIONS

International Preliminary Report on Patentability, International Application No. PCT/EP2012/061939 mailed Jan. 11, 2013.

* cited by examiner

*Primary Examiner* — Melvin C Mayes
*Assistant Examiner* — Colette Nguyen
(74) *Attorney, Agent, or Firm* — Leydig, Voit & Mayer

(57) ABSTRACT

The present invention relates to a method for producing a stable dispersion of nano-particles, comprising the steps: a) mixing a suspension of nano-particles with an aqueous solution of gelatine hydrolysate; and b) adding an aqueous solution of gelatine to the mixture. Furthermore, the invention relates to a stable dispersion of nano-particles as well as the use thereof.

17 Claims, No Drawings

METHOD FOR PRODUCING A STABLE DISPERSION OF NANO-PARTICLES, DISPERSION PRODUCED, AND USE THEREOF

CROSS REFERENCE TO RELATED APPLICATIONS

This patent application is a continuation of International Application Number PCT/EP2012/061939, filed Jun. 21, 2012, claiming the benefit of German Patent Application No. 10 2011 052 396.0, filed Aug. 4, 2011, which are each incorporated by reference.

The present invention relates to a method for producing a stable dispersion of nano-particles, especially nano-particles of inorganic materials.

Furthermore, the invention relates to a stable dispersion of nano-particles as well as the use thereof.

Nano-particles exhibit remarkable physical and optical properties which can be utilised for a multiplicity of different applications. Nano-particles of titanium dioxide for example are employed for achieving special optical effects in paints, lacquers and coatings, as additives for plastics, as UV filters in sun protection agents, in light emitting diodes, liquid crystal displays and solar cells or for producing dirt-repelling or self-cleaning surfaces by the utilization of a photo-catalytic effect. Nano-particles made of silicon dioxide are employed inter alia in inkjet photo papers and for improving the scratch resistance of lacquers, nano-particles made of aluminium oxide are used for coating optical lenses, windows and headlights e.g. in the field of automobile technology, and nano-particles made of zinc oxide are used as UV filters in sun protection agents.

In order to enable the special properties of the nano-particles to be utilised, a necessary prerequisite in most cases is the provision of a stable dispersion of the nano-particles, i.e. a long-lasting uniform distribution thereof in a liquid or solid medium without coagulation of the nano-particles. Processes for stabilizing dispersions of this type are of course already known (e.g. precise adjustment of the optimal pH value or the addition of complexing agents or steric stabilizers), but none of these approaches produces entirely satisfactory results. Particularly problematical is the attainment of a stable dispersion within a broad temperature range (e.g. from −18° C. to 80° C.).

The object of the invention is to propose an improved and easily carried out method for producing a stable dispersion of nano-particles.

Furthermore, the object of the invention is to provide a stable dispersion of nano-particles.

In regard to the method, this object is achieved in accordance with the invention by the following steps which are carried out in this order:

a) mixing an aqueous suspension of nano-particles with an aqueous solution of gelatine hydrolysate; and b) adding an aqueous solution of gelatine to the mixture.

In the context of the present invention, a stable dispersion of nano-particles is a dispersion in which—at least within a given temperature range—coagulation of the nano-particles does not occur.

In principle, the use of gelatine as a matrix for producing dispersions is known, inter alia, gelatine has already been used for a long time for the coating of photographic films. It has transpired however that a stable dispersion of nano-particles cannot be produced with gelatine alone, on the contrary, there is frequently an interaction between the gelatine and the nano-particles which leads to the immediate coagulation thereof, or the gelatine is cross-linked due to this strong interaction.

Surprisingly, it has been discovered by the inventors that this problem can be avoided if, before bringing the nano-particles into contact with the gelatine, the nano-particles suspended in water are mixed with an aqueous solution of gelatine hydrolysate in accordance with step a) of the method in accordance with the invention. Subsequently, the solution of the gelatine can then be added in accordance with step b), thereby resulting in a stable dispersion which can be used for different purposes in an advantageous manner. Obviously, the gelatine hydrolysate counteracts the disadvantageous interaction between the nano-particles and the gelatine in that it stabilizes the suspension of the nano-particles by steric and/or electrostatic effects and thereby prevents unwanted cross-linking of the gelatine.

The gel-forming properties of gelatine are crucial for distinguishing between gelatine and gelatine hydrolysate, i.e. an aqueous gelatine solution changes into a gel-like state below a certain temperature but this is not the case with gelatine hydrolysate due to its lower molecular weight.

It is preferred that the gelatine hydrolysate employed in the method in accordance with the invention have an average molecular weight of approximately 500 to approximately 9,000 Da, and more preferably, of approximately 2,500 to approximately 5,000 Da.

The gelatine hydrolysate can be produced from gelatine by chemical (i.e. acidic or alkaline) hydrolysis or by enzymatic hydrolysis by means of proteases, or alternatively, by the direct hydrolysis of collagens whereby the gelatine is then only formed as a non-isolated intermediate product.

Expediently, the gelatine employed in step b) of the method has an average molecular weight of at least 20,000 Da. The gel-strength of the gelatine is preferably approximately 200 to approximately 320 g Bloom, wherein this can be varied in dependence on the intended use of the suspension produced.

Both the gelatine and the gelatine hydrolysate which are employed in the method in accordance with the invention can be obtained from the connective tissue or from the bones of various types of animals, in particular, from the skin or the bones of pigs or cattle, or else of poultry or fish.

Preferably, step b) of the method in accordance with the invention is carried out at a temperature of approximately 40° C. to approximately 60° C. At these temperatures, even an aqueous solution of very highly viscous gelatine is usually fluid or sufficiently fluidic for enabling the mixture obtained in step a) to be converted into a generally homogeneous mixture. It is particularly expedient if not only the aqueous solution of gelatine has a temperature of approximately 40° C. to approximately 60° C., but if the mixture of the suspension of nano-particles together with the aqueous solution of gelatine hydrolysate is also heated up to the corresponding temperature before adding the gelatine in order to prevent local differences in temperature when adding the gelatine solution and too rapid cooling and gel-formation of the gelatine. However, the step a) can be carried out at a lower temperature (in particular at room temperature).

As a further step c), the method in accordance with the invention comprises in particular letting the mixture obtained in step b) cool down. During the cooling process, the initially liquid dispersion of the nano-particles changes into a dispersion in the gel state in which the nano-particles are distributed uniformly in a matrix of the gelatine gel and the coagulation thereof is prevented, in particular, by the presence of the gelatine hydrolysate. Thus, as a result of the method in accordance with the invention, one obtains a stable, gel-like dispersion of the nano-particles. Thereby, the temperature below which the gelatine solution changes into a gelatine gel depends on the viscosity or gel-strength of the gelatine employed and can be adjusted within a certain range by the selection thereof.

As already mentioned above, the method in accordance with the invention is at least partly based on an electrostatic stabilization of the nano-particles in the aqueous suspension by the gelatine hydrolysate. It is therefore particularly advantageous if the iso-electric point of the gelatine hydrolysate is selected in such a way that the value of the zeta potential of the nano-particles is increased by the mixing process in accordance with step a), i.e. the electrostatic repulsive forces between the particles are intensified and thus the tendency to coagulate is reduced. Thus, in essence, in the case of the method in accordance with the invention, the effect is contrary to that of a coacervation process.

The iso-electric point (IEP) of gelatine hydrolysate depends primarily on whether the hydrolysate is made of gelatine of the type A or of the type B, i.e. whether an acidic break-down (type A) or an alkaline break-down (type B) of the collagen occurs. Generally, gelatine hydrolysates of the type A have a higher IEP than gelatine hydrolysates of the type B, i.e. they have (for the same pH value) a greater surplus of positive charges in the form of $NH_3^+$ groups. In the frequently occurring case that the nano-particles exhibit a positive zeta potential, it is therefore preferable that the gelatine hydrolysate employed in step a) be a gelatine hydrolysate of the type A. The hydrolysate molecules attached to a nano-particle then increase its total positive charge and shield it from other nano-particles, whereby a steric effect also comes into play.

In the case where the nano-particles already exhibit a very high (positive) zeta potential, adequate stabilization can also be achieved using a gelatine hydrolysate of the type B.

Preferably, the IEP of the gelatine used in step b) is selected in such a way that any further effect produced upon the charge conditions is as small as possible. It is therefore preferable that the IEP of the gelatine be smaller or equal to the IEP of the gelatine hydrolysate.

In particular, if a gelatine hydrolysate of the type A was used in the step a), it is preferable that the gelatine be a gelatine of the type A or that it comprise a mixture of gelatines of the types A and B, wherein the gelatine or the mixture has an IEP of 6 to 10, preferably of 7 to 9.

Furthermore, in the event of a higher iso-electric point, it has been shown that gelling of the dispersion can set in at a temperature in the region of 60° C., i.e. immediately after adding the aqueous solution of gelatine in step b), whereas in the case of a lower iso-electric point the dispersion remains fluidic at first and only solidifies after being cooled down. Both cases can be advantageous depending upon the usage of the dispersion.

If a gelatine of the type B is employed, this preferably has an iso-electric point of 4 to 6.

The quantitative proportion of the nano-particles to the gelatine hydrolysate in step a) also has an effect upon the stability of the dispersion produced. It is particularly advantageous if the nano-particles and the gelatine hydrolysate are mixed in a weight ratio of approximately 2:1 to approximately 1:1.5, in each case referring to the dry weight. Thereby, the concentration of the nano-particles present in the initial suspension or in the dispersion produced depends primarily on the intended application thereof.

The solution of gelatine added in step b) preferably has a concentration of approximately 5 to approximately 20 weight-%, whilst the concentration of the gelatine in the dispersion resulting from the addition process preferably amounts to approximately 1 to approximately 10 weight-%, more preferably, to approximately 1 to approximately 5 weight-%. This concentration is sufficient for gel-formation.

The particle size of the nano-particles typically lies within the range of approximately 1 to approximately 100 nm. In connection therewith, nano-particles are preferred at the lower end of this range, in particular with a particle size of approximately 3 to approximately 10 nm.

Typically, the nano-particles which are employed in the method in accordance with the invention are formed from an inorganic material. Particularly preferred are nano-particles of titanium dioxide for which a stable dispersion thereof has a wide variety of uses, or else nano-particles made of aluminium oxide, silicon dioxide, zirconium dioxide, indium tin oxide (ITO), zinc oxide, zinc sulphide, molybdenum sulphide or silver. The method in accordance with the invention is not limited however to these materials.

In regard to the provision of a stable dispersion of nano-particles, the underlying object is achieved in accordance with the invention in that the dispersion comprises water, nano-particles, gelatine hydrolysate and gelatine. In particular, the dispersion in accordance with the invention is a dispersion which is produced with the help of the previously described method in accordance with the invention. Consequently, special advantages and preferred embodiments of the dispersion have already been described in connection with the method.

In the case of the stable dispersion of nano-particles in accordance with the invention, this is preferably a dispersion in which there is no coagulation of the nano-particles in a temperature range from approximately −18° C. to approximately 80° C. The dispersion is thus frost-proof on the one hand and can also be warmed up to temperatures significantly above the melting point of the gelatine gel on the other hand, i.e. the dispersion can be liquefied again in the course of the subsequent treatment thereof or the further use thereof without any coagulation of the nano-particles.

Due to its advantageous properties, the dispersion in accordance with the invention can be used in various ways. A preferable embodiment of the invention relates to the use of the stable dispersion in accordance with the invention for producing films, foils or coatings containing nano-particles. The dispersion is heated up and applied in liquid form to a surface that is to be coated or poured into an appropriate mould. Prior thereto, it is self-evident that yet further components can be added.

In the case of the coatings produced, these may be e.g. paints or lacquers exhibiting special optical effects or coatings for producing self-cleaning surfaces. Films and foils can be employed, inter alia, in the field of optoelectronics (e.g. for light emitting diodes, liquid crystal displays or solar cells).

EXAMPLES

The invention is described in more detail hereinafter with the aid of the following examples and comparative examples.

The (comparative) Examples 1 to 4 were carried out using nano-particles made of titanium dioxide having an average particle size of approximately 10 nm. These nano-particles have an IEP within the range of 5 to 6, and thus in the case of acidic pH values are positively charged (positive zeta potential).

The (comparative) Examples 5 to 11 were carried out using nano-particle made of titanium dioxide having an average particle size of approximately 100 nm and the IEP thereof likewise lies within the range of 5 to 6.

The Examples 12 and 13 were carried out using nano-particles made of aluminium oxide having an average particle size of approximately 100 nm. These nano-particles have an IEP within the range of 8 to 9 and thus, compared with the nano-particles made of titanium dioxide, have a higher positive zeta potential for the same pH value.

Comparative Example 1

The titanium dioxide nano-particles (approximately 10 nm) were prepared in the form of a 20 weight-% aqueous suspension having a pH value of 1.5. 12 g of this suspension were mixed with 60 ml of a 1.5 weight-% gelatine solution (pork-rind gelatine of the type A having 290 g Bloom, a viscosity of 5.4 mPas and an IEP of 9) at 60° C.

A sharp rise in viscosity and a coagulation of the nano-particles were observed which is attributable to unwanted interactions between the particles and the gelatine.

Example 2

12 g of the suspension of titanium dioxide nano-particles as in the Comparative example 1 were mixed with 55 g of a 9 weight-% solution of gelatine hydrolysate of the type A having an IEP of approximately 9 and an average molecular weight of approximately 2,500 Da at 60° C. A yellow colouring of the mixture but no coagulation of the nano-particles was observed.

Subsequently, 10 ml of a 10 weight-% gelatine solution (pork-rind gelatine of the type A having 290 g Bloom, a viscosity of 5.4 mPas and an IEP of 9) were added likewise at a temperature of 60° C. The viscosity of the mixture thereupon rose significantly (the mixture had a honey-like consistency). However, there was no coagulation of the nano-particles.

The resulting dispersion of nano-particles was cooled down and solidified at a temperature of 25° C. into a gel. This could be melted again at 40° C. and solidified once more upon cooling. After tempering the gel at a temperature of 80° C. for 12 hours, the dispersion solidified again at 11° C. and could be melted at 24° C.

No indication of coagulated nano-particles or a phase separation were found, also when observing gelled thin layer films of the dispersion through an optical microscope (100-times magnification). The films were completely homogeneous. There was no coagulation of the nano-particles within a temperature range of −18° C. to 80° C.

Example 3

The nano-particles used and the gelatine hydrolysate as well as the execution of the method correspond to those in Example 2 with the exception that, in place of the pork-rind gelatine of the type A, a gelatine mixture of the types A and B having 250 g Bloom, a viscosity of 3.5 mPas and an IEP of 7 was used.

The resulting dispersion of nano-particles solidified into a gel at a temperature of 19° C. when cooled. This could be melted again at 33° C. After tempering of the gel at a temperature of 60° C. for 12 hours, the dispersion solidified again at 16° C. and could be melted at 29° C.

In this case too, no indication of coagulated nano-particles or a phase separation were found when observing the resultant thin layer films through an optical microscope. There was no coagulation of the nano-particles within a temperature range of −18° C. to 80° C.

Comparative Example 4

12 g of the suspension of titanium dioxide nano-particles as in the Comparative example 1 were mixed with 55 g of a 9 weight-% solution of gelatine hydrolysate of the type B having an IEP of approximately 5 and an average molecular weight of approximately 2,500 Da at 60° C.

A coagulation of the nano-particles was observed since the IEP of the gelatine hydrolysate of the type B is obviously too low, this thereby leading to a charge equalisation process in place of the desired increase of the zeta potential.

Comparative Example 5

The titanium dioxide nano-particles (approximately 100 nm) were prepared in the form of a 30 weight-% aqueous suspension having a pH value of 7.3. 12 g of this suspension were mixed with 60 ml of a 1.5 weight-% gelatine solution (gelatine mixture of the types A and B having 250 g Bloom, a viscosity of 3.5 mPas and an IEP of 7) at 60° C.

A coagulation of the nano-particles was observed which is attributable to unwanted interactions between the particles and the gelatine.

Example 6

12 g of the suspension of titanium dioxide nano-particles as in the Comparative example 5 were mixed with 55 g of a 9 weight-% solution of gelatine hydrolysate of the type A having an IEP of approximately 9 and an average molecular weight of approximately 2,500 Da at 60° C. A yellow colouring of the mixture but no coagulation of the nano-particles was observed.

Subsequently, 10 ml of a 10 weight-% gelatine solution (pork-rind gelatine of the type A having 290 g Bloom, a viscosity of 5.4 mPas and an IEP of 9) were added, likewise at a temperature of 60° C. The viscosity of the mixture thereupon rose significantly (the mixture had a honey-like consistency). However, no coagulation of the nano-particles occurred.

A macroscopically and microscopically homogeneous dispersion was obtained. In addition, no coagulation occurred after tempering at a temperature of 60° C. for 3 hours.

Example 7

The materials used and the execution correspond to those of Example 6, with the exception that 55 g of an only 5 weight-% solution of the gelatine hydrolysate were employed.

A macroscopically homogeneous dispersion was obtained although in the optical microscope (100-times magnification) this was more inhomogeneous than the dispersion in Example 6. This is attributable to a somewhat poorer stabilization process due to the smaller quantity of gelatine hydrolysate in relation to the nano-particles.

Example 8

The materials used and the execution correspond to those in Examples 6 and 7, with the exception that 55 g of an only 2 weight-% solution of the gelatine hydrolysate were employed.

A coagulation of the nano-particles was observed which is attributable to the very small quantity of gelatine hydrolysate.

Comparative Example 9

12 g of the suspension of titanium dioxide nano-particles as in the Comparative example 5 were mixed with 55 g of a 9 weight-% solution of gelatine hydrolysate of the type B having an IEP of approximately 5 and an average molecular weight of approximately 2,500 Da at 60° C.

A coagulation of the nano-particles was observed since the IEP of the gelatine hydrolysate of the type B is obviously too low, thereby leading to a charge equalisation process in place of the desired increase of the zeta potential.

Example 10

12 g of the suspension of titanium dioxide nano-particles as in the Comparative example 5 were first adjusted to a pH value of 9 by the addition of a caustic soda solution and then mixed with 55 g of a 9 weight-% solution of gelatine hydrolysate of the type A having an IEP of approximately 9 and an average molecular weight of approximately 2,500 Da at 60° C. No coagulation of the nano-particles was observed.

Subsequently, 10 ml of a 10 weight-% gelatine solution (gelatine mixture of the types A and B having 250 g Bloom, a viscosity of 3.5 mPas and an IEP of 7) were added, likewise at a temperature of 60° C.

The resulting dispersion was cooled down and solidified into a gel.

Under the scanning electron microscope, no agglomerates of titanium dioxide nano-particles were visible despite the high charge of the surface. Instead, there was a homogeneous distribution of the individual particles even in the dried up film layers. In addition, EDX measurements (Energy Dispersive X-ray spectroscopy) carried out in parallel at several places of the film always showed a constant proportion of the elements. In particular, a constant proportion of titanium from the nano-particles to the carbon and to the trace elements sodium and potassium of the gelatine matrix was always found.

Example 11

The nano-particles used and the gelatine as well as the execution of the method correspond to Example 10 with the exception that, in place of the gelatine hydrolysate of the type A, a gelatine hydrolysate of the type B having an IEP of approximately 5 and an average molecular weight of approximately 2,500 was used.

No coagulation of the nano-particles was observed. The resulting dispersion was cooled down and solidified into a gel. In this case, in contrast to the Comparative example 9, stabilization of the nano-particles by the gelatine hydrolysate of the type B is possible due to the increased pH value.

Example 12

The aluminium oxide nano-particles (approximately 100 nm) were prepared in the form of a 40 weight-% aqueous suspension having a pH value of 4. 12 g of this suspension were mixed with 55 g of a 9 weight-% solution of gelatine hydrolysate of the type A having an IEP of approximately 9 and an average molecular weight of approximately 2500 Da at 60° C. A milky opaque mixture was obtained, but no coagulation of the nano-particles was observed.

Subsequently, 10 ml of a 10 weight-% gelatine solution (gelatine mixture of the types A and B having 250 g Bloom, a viscosity of 3.5 mPas and an IEP of 7) were added, likewise at a temperature of 60° C.

The resulting dispersion of nano-particles solidified into a gel when cooled to a temperature of 17° C. This could be melted again at 30° C. After tempering the gel at a temperature of 60° C. for 12 hours, the dispersion solidified once more at 15° C. and could be melted at 27° C.

Example 13

The nano-particles used and the gelatine as well as the execution of the method correspond to Example 12 with the exception that, in place of the gelatine hydrolysate of the type A, a gelatine hydrolysate of the type B having an IEP of approximately 5 and an average molecular weight of approximately 2,500 was used. After the addition thereof, a milky opaque mixture was also obtained here, but no coagulation of the nano-particles was observed.

The resulting dispersion of nano-particles was cooled down and solidified into a gel.

Due to the higher IEP of the aluminium oxide nano-particles compared with the titanium dioxide nano-particles, the former can also be stabilized by the gelatine hydrolysate of the type B having a lower IEP.

The stable dispersions of nano-particles produced in accordance with the preceding examples can be used, inter alia, for producing films, foils or coatings containing nano-particles, wherein the dispersions can be further processed after melting of the gelatine gel, in particular, by means of casting, spraying or similar processes.

The invention claimed is:

1. A method for producing a stable dispersion of nano-particles, comprising:
    a) first, mixing an aqueous suspension of nano-particles with an aqueous solution of gelatine hydrolysate and obtaining a mixture, wherein the gelatine hydrolysate has an average molecular weight of approximately 500 to approximately 9,000 Da; and
    b) thereafter, adding an aqueous solution of gelatine to the mixture obtained in a), and obtaining a stable dispersion of nano-particles, wherein the gelatine has an average molecular weight of at least 20,000 Da and a gel-strength of approximately 200 to approximately 320 g Bloom,
    wherein the nano-particles are formed from an inorganic material selected from titanium dioxide, aluminium oxide, silicon dioxide, zirconium dioxide, indium tin oxide (ITO), zinc oxide, zinc sulphide, molybdenum sulphide or silver, and wherein an iso-electric point of the gelatine hydrolysate is selected in such a way that the nano-particles have a value of a zeta potential that is increased by mixing in accordance with a).

2. The method in accordance with claim 1, wherein b) is carried out at a temperature of approximately 40 to approximately 60° C.

3. The method in accordance with claim 2, further comprising:
    c) letting the mixture obtained in b) cool down.

4. The method in accordance with claim 1, wherein the nano-particles exhibit a positive zeta potential and wherein the gelatine hydrolysate is a gelatine hydrolysate of type A.

5. The method in accordance with claim 1, wherein an iso-electric point of the gelatine employed in b) is smaller than or equal to the iso-electric point of the gelatine hydrolysate employed in a).

6. The method in accordance with claim 1, wherein the gelatine is a gelatine of type A or comprises a mixture of gelatines of types A and B, and wherein the gelatine or the mixture has an iso-electric point of 6 to 10.

7. The method in accordance with claim 6, wherein the gelatine or the mixture has an iso-electric point of 7 to 9.

8. The method in accordance with claim 1, wherein the gelatine is a gelatine of type B and has an iso-electric point of 4 to 6.

9. The method in accordance with claim 1, wherein the nano-particles and the gelatine hydrolysate in accordance with a) are mixed in a dry weight ratio of approximately 2:1 to approximately 1:1.5.

10. The method in accordance with claim 1, wherein the solution of gelatine added in b) has a concentration of approximately 5 to approximately 20 weight-%, and wherein the concentration of the gelatine in the dispersion resulting from b) is approximately 1 to approximately 10 weight-%.

11. The method in accordance with claim 10, wherein the concentration of the gelatine in the dispersion resulting from b) is approximately 1 to approximately 5 weight-%.

12. The method in accordance with claim 1, wherein the nano-particles have an average particle size within the range of approximately 1 to approximately 100 nm.

13. The method in accordance with claim 12, wherein the nano-particles have an average particle size within the range of approximately 3 to approximately 10 nanometer.

14. A stable dispersion produced in accordance with the method of claim 1.

15. The stable dispersion in accordance with claim 14, in which there is no coagulation of the nano-particles in a temperature range from approximately −18° C. to approximately 80° C.

16. A film, a foil or a coating containing nano-particles, produced from the stable dispersion of nano-particles according to claim 14.

17. The method of claim 1, wherein the gelatine hydrolysate has an
 average molecular weight of approximately 2,500 to approximately 5,000 Da.

\* \* \* \* \*